United States Patent [19]

Zucker

[11] Patent Number: 5,067,017
[45] Date of Patent: * Nov. 19, 1991

[54] COMPATIBLE AND SPECTRUM EFFICIENT HIGH DEFINITION TELEVISION

[76] Inventor: Leo Zucker, 2591 Dunning Dr., Yorktown Heights, N.Y. 10598

[*] Notice: The portion of the term of this patent subsequent to Feb. 27, 2007 has been disclaimed.

[21] Appl. No.: 479,340

[22] Filed: Feb. 13, 1990

Related U.S. Application Data

[63] Continuation-in-part of Ser. No. 303,917, Jan. 30, 1989, Pat. No. 4,905,084.

[51] Int. Cl.$^5$ .................. H04N 17/04; H04N 11/06; H04N 5/44; H04N 7/08
[52] U.S. Cl. .................. 358/141; 358/11; 358/12; 358/142; 358/15; 358/186; 358/188
[58] Field of Search .................. 358/11, 12, 141, 142, 358/88, 186, 187, 15, 144, 187, 188

[56] References Cited

U.S. PATENT DOCUMENTS

| | | | |
|---|---|---|---|
| 2,820,844 | 1/1958 | Beers | 358/15 |
| 3,617,626 | 11/1971 | Bluth et al. | 358/311 |
| 3,830,971 | 8/1974 | van de Polder | 358/140 |
| 4,389,668 | 6/1983 | Favreau | 358/140 |
| 4,429,327 | 1/1984 | Oakley et al. | 358/12 |
| 4,485,401 | 11/1984 | Tan et al. | 358/12 |
| 4,521,803 | 6/1985 | Gittinger | 358/12 |
| 4,535,352 | 8/1985 | Haskell | 358/16 |
| 4,567,508 | 1/1986 | Hulver | 358/11 |
| 4,574,300 | 3/1986 | Hulyer | 358/11 |
| 4,605,950 | 8/1986 | Goldberg et al. | 358/141 |
| 4,622,578 | 11/1986 | Rzeszewski | 358/12 |
| 4,665,438 | 5/1987 | Miron et al. | 358/183 |
| 4,682,234 | 7/1987 | Naimpally | 358/183 |
| 4,694,338 | 9/1987 | Tsinberg | 358/141 |
| 4,707,728 | 11/1987 | Hurst | 358/12 |
| 4,720,744 | 1/1988 | Washi et al. | 358/141 |
| 4,905,084 | 2/1990 | Zucker | 358/141 |

FOREIGN PATENT DOCUMENTS 0114694 5/1988 European Pat. Off. .

OTHER PUBLICATIONS

Statement of FCC Chairman Alfred C. Sikes to the Advisory Committee for Advanced Television, Mar. 21, 1990.
First Report & Order, MM Docket No. 87—268, FCC 90—295, Released Sep. 21, 1990.
Understanding Communications Systems, D. L. Cannon et al., Sams division of Macmillan Computer Pub. (1984), pp. 78-81.

(List continued on next page.)

Primary Examiner—John K. Peng
Attorney, Agent, or Firm—Leo Zucker

[57] ABSTRACT

A spectrum-efficient channel compatible technique of broadcasting and receiving television signals includes generating image signals corresponding to certain parts of an image frame to be transmitted, modulating first image signals corresponding to first contents of the image frame on a first radio frequency (RF) carrier wave signal corresponding to a television channel to produce first RF television signals, and modulating second image signals corresponding to second contents of the image frame on a second RF carrier wave signal corresponding to the television channel to produce second RF television signals. The first RF television signals are radiated from a first antenna having a first polarization, and the second RF television signals are radiated from a second antenna having a second polarization orthogonal to the first polarization. A first tuner/demodulator at a receiver detects the first RF television signals from the first RF carrier wave signal to obtain the first image signals, and a second tuner/demodulator detects the second RF television signals from the second RF carrier wave signal to obtain the second image signals. The tuner/demodulators include circuitry that enables them to discriminate between the two received RF carrier wave signals. The obtained first and second image signals are supplied to a display drive stage that drives an associated display to reproduce the transmitted image frame.

24 Claims, 4 Drawing Sheets

OTHER PUBLICATIONS

U. L. Rohde et al., Communications Receivers-Principles and Design, McGraw-Hill (1988), pp. 390-405, 422-425.

Antenna Technology for Frequency Reuse Satellite Communications, R. W. Kreutel, Jr. et al., vol. 65, Proc. of the IEEE, No. 3 (Mar. 1977), pp. 370-378.

Restoring the Orthogonality of Two Polarizations in Radio Communication Systems I & II, T. S. Chu, The Bell System Technical Journal, vol. 50, No. 9, Nov. 1971, at 3063-69; and vol. 52, No. 3, Mar. 1973 at 319-327.

M. Javid & P. M. Brown, Field Analysis and Electromagnetics, pp. 293-294 (McGraw-Hill, 1963).

R. C. Johnson & H. Jasik, Antenna Engineering Handbook, pp. 23-4 to 23-11 (McGraw-Hill 1984).

Advertisement for the NEC model IDC-1000 Improved Definition Converter, AV Video at p. 33, Feb. 1989.

H. W. Saus & Co., Reference Data for Engineers, p. 23-6 (7th ed., 1985).

R. Angus, "The HDTV Revolution", Popular Electronics, pp. 61 et seq., Sep. 1989.

COMPATIBLE AND SPECTRUM EFFICIENT HIGH DEFINITION TELEVISION

CROSS REFERENCE TO RELATED APPLICATION

This application is a continuation-in-part of my co-pending application Ser. No. 07/303,917 filed Jan. 30, 1989, which issued as U.S. Pat. No. 4,905,084 on Feb. 27, 1990.

BACKGROUND OF THE INVENTION

1. Field of the Invention

The present invention relates to advanced television (ATV) systems; and particularly to a high definition television (HDTV) broadcast system and method utilizing properties of radiated electromagnetic waves and antenna technology to allow for compatibility with existing television receivers, and to contain the radio frequency (RF) bandwidth of broadcast HDTV signals within current television channel allocations.

2. Discussion of the Known Art

A. Current ATV Regulation Policy.

On Sept. 1, 1988, the Federal Communications Commission (FCC) released a Tentative Decision and Further Notice of Inquiry (NOI), FCC 88-288, with respect to an ongoing review of Advanced Television Systems and Their Impact on the Existing Television Broadcast Service (MM Docket No. 87-268). A summary of the NOI is printed in the Federal Register of Oct. 3, 1988, 53 FR 38747-49. As described in the NOI, current state of the art non-broadcast television techniques provide picture resolution and color approaching that obtainable with 35 mm film.

The FCC determined that the public would benefit from a terrestrial broadcast ATV service, but that most systems currently proposed by industry had one or more of the following disadvantages 1. Non-compatibility with existing color television receivers manufactured according to the United States 30 frame per second, two-field interlaced scan, 525 line NTSC (National Television System Committee) color standard, adopted in 1953.

2. A requirement of more than six megahertz bandwidth for transmission of the entire ATV signal, thus exceeding the currently allocated terrestrial television broadcast channel bandwidth if the proposed ATV signal is modulated and broadcast on a radio frequency carrier wave.

3. For those proposed ATV systems categorized as compatible with existing receivers, picture resolution is diminished when received on a standard television set, and/or the quality of the picture when reproduced on a "high definition" receiver is degraded during movement of the televised image.

The FCC initially concluded that any broadcast standards for a new ATV terrestrial service shall be such as to overcome (1) and (2) above. That is, an approved system would be one that is compatible with the many existing color television receivers now in use in the United States so as not to make them suddenly obsolete, and one that will not require additional broadcast frequency allocations to realize maximum picture definition.

The requirement that the existing broadcast television frequency allocations be used for an ATV broadcast service, is dictated both from an administrative and a technical point of view. First, any additional required spectrum might be at the expense of another (non-television) allocated service and would require lengthy hearings to obtain. Second, the additional spectrum might be so far removed in wavelength from existing television channel frequencies on which the "compatible" parts of ATV signals must be broadcast, that differences in propagation characteristics would likely degrade, rather than enhance, the received picture quality.

By way of a policy statement issued Mar. 21, 1990, the FCC redefined its objectives by stating its intention to select a so-called "simulcast" HDTV standard, viz., one that is "compatible with the current 6 MHz channelization plan but employing new design principles independent of NTSC technology". Statement of Chairman Alfred C. Sikes to the Advisory Committee for Advanced Television, Mar. 21, 1990. Thus, the FCC's initial conclusion that any newly adopted HDTV standard should be NTSC compatible, was relaxed in favor of allowing for a new television signal format, provided the RF spectrum of the broadcast signal does not exceed a 6 MHz bandwidth. See also First Report and Order, MM Docket No. 87-268, FCC 90-295, Adopted Aug. 24, 1990, and Released Sept. 21, 1990.

B. Patented Compatible ATV Techniques.

U.S. Pat. No. 4,521,803 issued June 4, 1985, discloses a system for compatible transmission of high-resolution television. Basically, a high resolution (e.g., 1,050 line) television camera simultaneously produces signals corresponding to a pair of adjacent scanned lines of an image. To provide a compatible 525 line picture for reception by existing receivers, luminance and chrominance signals for each scanned pair of adjacent lines are additively combined and broadcast at the conventional line frequency rate of about 15,750 lines per second. The luminance signals for each adjacent line pair are also subtracted from one another to produce difference signals that modulate a carrier phased in quadrature with the luminance carrier of the broadcast television signal. Suitable decoding equipment in a "high definition" television receiver would derive luminance signals for each of the 1,050 scanned lines by detecting and processing the additively combined and difference signals, according to the patent.

Another compatible HDTV system utilizing a high-resolution vidicon capable of 1,050 line resolution, is disclosed in U.S. Pat. No. 4,707,728 issued Nov. 17, 1987. According to the patent, a difference or "delta" signal representative of fine picture detail is transmitted during the vertical blanking interval, and a suitably equipped receiver detects and combines the delta signal with received limited bandwidth signals, to reproduce a high-definition picture. Maximum definition is obtainable only for still images at the receiver, however, since transmission of the delta signal is inhibited during frame-to-frame motion of the televised image.

European Patent 114,694 granted May 18, 1988, discloses a system for transmitting high resolution image line signals in a time multiplex manner, wherein chrominance information is followed by luminance information during corresponding portions of each line scan period (the so-called multiplex analog component or "MAC" system). Two conventional television channels are required for transmission and reception of a high resolution television picture, while a standard resolution picture may be received over one of the channels.

C. Principles of the Present Invention.

As far as is known, no system or technique has been proposed that utilizes physical properties of radiated electromagnetic waves and antenna technology, to enable broadcasting of HDTV signals compatible with existing television receivers and confined within the currently allocated spectrum for the terrestrial broadcast television service.

U.S. Pat. No. 2,820,844 issued Jan. 21, 1958, shows a black-and-white compatible color television broadcasting system, wherein brightness information for each image line is radiated from a horizontally polarized antenna, and corresponding color information for each line is radiated from a vertically polarized antenna.

It is known generally that if mutually orthogonally polarized transverse electromagnetic (TEM) waves, e.g., one horizontally polarized and the other vertically polarized, are transmitted in free space at the same frequency or wavelength, different information modulated on each of the waves can be separately received and demodulated by use of correspondingly polarized receiving antennas. See M. Javid & P. M. Brown, Field Analysis and Electromagnetics, at 294, McGraw-Hill (1963).

R. C. Johnson and H. Jasik, in their Antenna Engineering Handbook, McGraw-Hill (2d ed. 1984), point out (at page 23-9) that "[f]or any arbitrarily polarized antenna, there can be another antenna polarized so that it will not respond to the wave emanating from the first antenna. The polarizations of the two are said to be orthogonal."

Johnson and Jasik also disclose that the deployment of an increasing number of communications satellites has required use of the same frequency to communicate with adjacent areas on the earth. To enable such "frequency reuse", orthogonal polarizations are employed. Orthogonal circularly polarized transmitting and receiving antenna pairs, when used for frequency reuse with communications satellites, are reported to provide channel isolation in excess of 20 dB. Johnson & Jasik, at 23-4.

Current television transmission standards prescribed by the FCC at 47 C.F.R. 73.682 (a)(14) call for horizontal polarization as "standard", but allow circular or elliptical polarization to be employed if desired. In the latter case, the licensed effective radiated power (ERP) of the vertically polarized component may not exceed the licensed ERP of the horizontally polarized component.

SUMMARY OF THE INVENTION

An object of the invention is to overcome the above and other disadvantages in the HDTV systems proposed thus far.

Other objects of the presently disclosed HDTV system and technique include:

1. Compliance with the guidelines established by the FCC with respect to adoption of any new standards for a terrestrial ATV service.

2. Compatibility with all the current 6 MHz channelization plan as prescribed by the FCC at 47 C.F.R. 73.682, relevant portions of which are incorporated by reference herein.

3. No need for special converters or other decoding devices to be used with existing receivers, so as to permit continuing reception of television programs when broadcast with a compatible HDTV signal according to the present technique.

4. Little, if any, degradation in picture quality when a HDTV compatible signal transmitted according to the present technique is received and demodulated by the existing receivers.

5. No requirement of increased channel bandwidth or new spectrum allocations for implementation of the present HDTV system.

6. A minimum number of new broadcast standards that need be established, thus facilitating the regulatory implementation of the present system.

7. An opportunity for certain technologies to advance and new manufacturing methods to evolve, as components of the present system are produced to meet commercial demands.

8. A HDTV system that is readily capable of transmission over existing cable television installations.

According to the invention, television transmitting apparatus includes image source means for generating image line signals corresponding to an image frame having a resolution of N scan lines, wherein successive lines n comprising the image frame are consecutively numbered from n=1 to N. First modulator means coupled to the image source means modulates image line signals each corresponding to a different odd numbered line of the image frame on a first radio frequency (RF) carrier wave signal to produce corresponding odd line image signals, and second modulator means coupled to the image source means modulates image line signals each corresponding to a different even numbered line of the image frame on a second RF carrier wave signal to produce corresponding even line image signals. Control means coupled to the image source means causes the image source means to supply the image line signals to the first and the second modulator means so that corresponding portions of the odd and the even line image signals are produced in phase with one another by both said modulator means.

According to another aspect of the invention, television receiving apparatus for reproducing a transmitted image frame, includes first tuner/demodulator means for detecting first image line signals modulated on a first received carrier signal having a certain carrier frequency, and second tuner/demodulator means for detecting second image line signals modulated on a second received carrier signal having said certain carrier frequency. Display drive means is coupled to the first and the second tuner/demodulator means, and control means operates to supply the detected first and second image line signals from both of the tuner/demodulator means to the display drive means with a determined timing for reproducing the transmitted image frame.

A further aspect of the invention entails a method of transmitting television signals comprising; generating from image source means image signals corresponding to certain parts of an image frame to be transmitted, first modulating first image signals from the image source means corresponding to first contents of the image frame on a first radio frequency (RF) carrier wave signal of a certain phase to produce corresponding first RF television signals, second modulating second image signals from the image source means corresponding to second contents of the image frame on a second RF carrier wave signal of a certain phase to produce corresponding second RF television signals, and carrying out the first and said second modulating steps so that corresponding portions of the first and the second image signals are modulated on the carrier wave signals for transmission simultaneously with one another.

According to yet another aspect of the invention, a technique of broadcasting and receiving television signals comprises; generating from image source means image signals corresponding to certain parts of an image frame to be transmitted, modulating first image signals from the image source means corresponding to first contents of the image frame on a first radio frequency (RF) carrier wave signal of a certain phase to produce corresponding first RF television signals, modulating second image signals from the image source means corresponding to second contents of the image frame on a second RF carrier wave signal of a certain phase to produce corresponding second RF television signals, radiating the first RF television signals from first antenna means having a first polarization, radiating the second RF television signals from second antenna means having a second polarization orthogonal to the first polarization, detecting with first tuner/demodulator means at a receiver the first RF television signals modulated on the first RF carrier wave signal thereby obtaining the first image signals, detecting with second tuner/demodulator means at the receiver the second RF television signals modulated on the second RF carrier wave signal thereby obtaining the second image signals, providing a single frequency source at the receiver to enable common frequency tracking by both of the tuner/demodulator means, and supplying the obtained first and second image signals to display drive means at a certain timing determined so that the display drive means drives an associated display to reproduce the transmitted image frame.

A further aspect of the invention resides in a spectrum-efficient channel compatible technique of broadcasting and receiving television signals including; generating from image source means image signals corresponding to certain parts of an image frame to be transmitted, modulating first image signals from the image source means corresponding to first contents of the image frame on a first radio frequency (RF) carrier wave signal corresponding to a certain television channel to produce corresponding first RF television signals, modulating second image signals from the image source means corresponding to second contents of the image frame on a second RF carrier wave signal corresponding to said certain television channel to produce corresponding second RF television signals, radiating the first RF television signals from first antenna means having a first polarization, radiating the second RF television signals from second antenna means having a second polarization orthogonal to the first polarization, detecting with first tuner/demodulator means at a receiver the first RF television signals modulated on the first RF carrier wave signal thereby obtaining the first image signals, detecting with second tuner/demodulator means at the receiver the second RF television signals modulated on the second RF carrier wave signal thereby obtaining the second image signals, providing the tuner/demodulator means with threshold detection means thereby enabling each of the tuner/demodulator means to capture the RF television signals modulated on a received higher level RF carrier wave signal coupled to the tuner/demodulator means, and supplying the obtained first and second image signals to display drive means at a certain timing determined so that the display drive means drives an associated display to reproduce the transmitted image frame.

For a better understanding of the present invention, together with other and further objects, reference is made to the following description taken in conjunction with the accompanying drawing, and the scope of the invention will be pointed out in the appended claims.

DETAILED DESCRIPTION OF THE INVENTION

Figure 1:
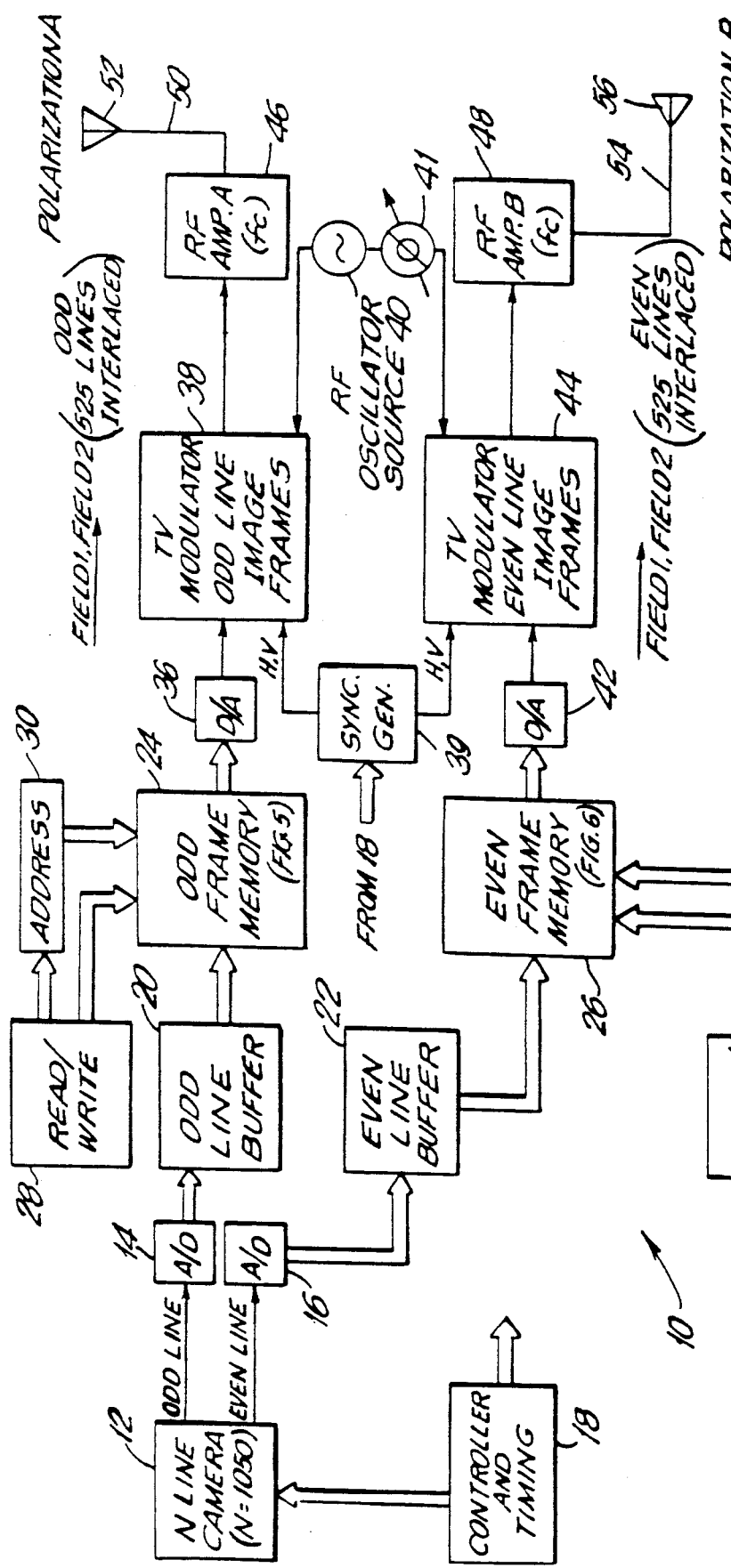
FIG. 1 is a schematic block diagram of a HDTV broadcasting system according to the invention.

FIG. 1 is a schematic block diagram of a high definition television (HDTV) broadcasting system 10 according to the invention.

Basically, system 10 includes a high definition camera source 12 of the kind disclosed in, for example, U.S. Pat. No. 4,521,803 issued June 4, 1985, or in U.S. Pat. No. 4,707,728 issued Nov. 17, 1987. Relevant portions of both patents are incorporated by reference herein. Camera source 12 includes a high-resolution color vidicon capable of scanning about twice the number of horizontal lines per image frame, than the number of lines scanned in the current NTSC broadcasting system. That is, camera source 12 is arranged to produce about 1,050 horizontal lines of resolution for each image frame.

Through the use of a wobble signal generator or similar known techniques, a scanning electron beam in the camera source 12 is caused to deviate periodically in the vertical direction while scanning horizontally. The frequency and amplitude of such deviation is set so that luminance and chrominance information corresponding to picture elements (pixels) of a pair of adjacent lines, is generated simultaneously. That is, of the 1,050 horizontal lines scanned for each image frame, information for lines 1 and 2 is simultaneously generated first, then lines 3 and 4, lines 5 and 6, and so on through lines 1049 and 1050.

In the present system 10, information corresponding to the odd line (line 1, line 3, line 5, . . . , line 1049) of each adjacent pair is converted to digital form by analog-to-digital (A/D) converter stage 14, while the line pair is scanned by the camera source 12. Information corresponding to the even line (line 2, line 4, line 6, . . . , line 1050) of each adjacent pair is converted to digital form by A/D converter stage 16, while the line pair is being scanned.

Camera source 12, A/D converter stages 14 and 16, and other components of the system 10 are subject to operational timing, synchronization, and control by controller and timing circuitry 18.

Digital information corresponding to luminance and chrominance values for a number of picture elements or pixels along a given odd line, is input to odd line buffer stage 20 when supplied from the output of A/D converter 14, to be stored or latched temporarily in the buffer 20. Likewise, digital information corresponding to luminance and chrominance values for a number of pixels along a given even line, is input to even line buffer 22 stage as supplied from the output of A/D converter 16, to be stored or latched temporarily in the buffer 22. The odd and the even line buffer stages 20, 22 can be known line memory devices comprised of, e.g., serial shift registers.

Each odd line of video information latched in the buffer 20 is written into a selected line or row address of odd frame memory stage 24. Similarly, each even line of video information latched in the buffer 22 is written into a selected line or row address of even frame memory stage 26. Each of the odd and the even frame memory stages 24, 26 may be comprised of one or more frame memory or storage devices capable of storing luminance and chrominance information for a 525 line video image, wherein a predetermined number of picture elements or pixels define each line.

Writing of each odd line of information from the odd line buffer 20 into selected row addresses of the odd frame memory 24, is performed under the control of read/write controller 28 and address select circuit 30 which, in turn, are subject to the control of controller and timing circuitry 18. Writing of each even line of information from the even line buffer 22 into selected row addresses of the even frame memory 26, is accomplished through read/write controller 32 and address select circuit 34 which, in turn, are also subject to control by the controller and timing circuitry 18.

An important feature of the present system resides in the manner in which each odd line of video information from odd line buffer 20 is first written into, and then read out from, the odd frame memory 24; and the manner in which each even line of video information from even line buffer 22 is first written into, and then read out from, the even frame memory 26.

Figure 5:
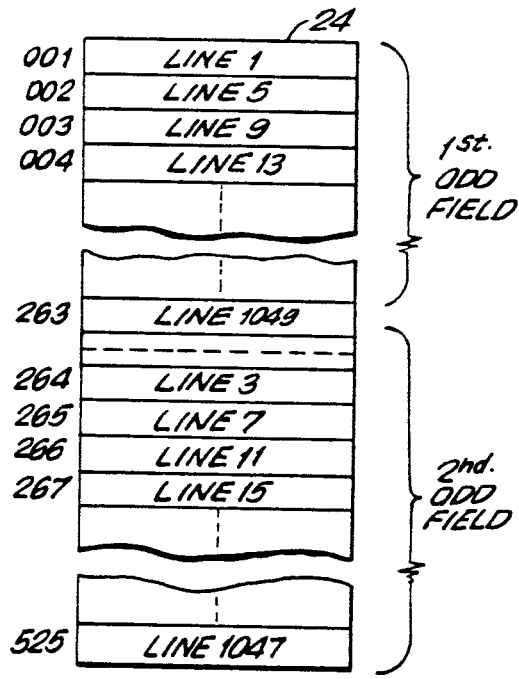
FIG. 5 is a memory map showing addresses for storage of odd image lines in a frame memory of the system in FIG. 1.

Specifically, read/write controller 28 operates so that as each odd line of video information is read out from odd line buffer 20, it is written in odd frame memory 24 at a row address as shown in the memory map of FIG. 5. That is, for odd lines 1, 5, 9, 13, . . . , 1049, the lines are written in "first odd field" row addresses 001 to 263, respectively. For odd lines 3, 7, 11, 15, . . . , 1047, the lines are written in "second odd field" row addresses 264 to 525, respectively, of the memory 24.

Figure 6:
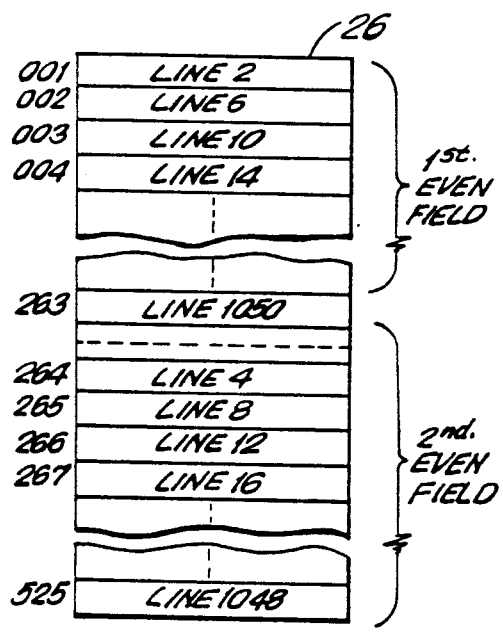
FIG. 6 is a memory map showing addresses for storage of even image lines in a frame memory of the system in FIG. 1.

Read/write controller 32 is operated such that as each even line of video information is read out from even line buffer 22, it is written in even frame memory 26 at a row address as shown in FIG. 6. Namely, for even lines 2, 6, 10, 14, . . . , 1050, the lines are written into "first even field" row addresses 001 to 263, respectively. For even lines 4, 8, 12, 16, . . . , 1048, the lines are written into corresponding "second even field" row addresses 264 to 525 of frame memory 26.

By selectively reading out the lines of video information as stored in the odd frame memory 24, an NTSC compatible, interlaced 525 line video frame signal is produced. Under the control of controller and timing circuitry 18, the read/write controller 28 successively selects row addresses 001, 002, 003, 004, . . . , 263 from which the video information stored at each row address is read out and input to D/A converter stage 36. Thus, during a first field timing period, the stored "first odd field" is converted into a conventional first field of a 525 video image frame comprised of all the odd image lines scanned by the camera source 12. During a second field timing period, read/write controller 28 successively selects row addresses 264, 265, 266, 267, . . . , 525 of the memory 24, from which video information stored at each row address is read out and input to the D/A converter stage 36. Accordingly, the stored "second odd field" is converted into a conventional second field of the 525 odd line video image frame. The first and the second fields output from D/A converter 36 are applied to a TV modulator 38 which has a radio frequency oscillator 40 that determines the broadcast carrier frequency. TV modulator 38 combines horizontal (H) and vertical (V) synchronization pulses at properly timed intervals to the stream of analog signals output from D/A converter 36. The H and the V pulses are produced by a sync generator 39 which is responsive to the controller and timing circuitry 18.

Further, by reading out lines of video information stored in the even frame memory 26, an NTSC compatible, interlaced 525 line video frame signal is produced for broadcast. During a first field timing period, which may coincide with the one mentioned above, read/write controller 32 successively selects row addresses 001, 002, 003, 004, . . . , 263 from which video information stored at each row address is read out and input to D/A converter stage 42. The stored "first even field" is thus converted into a conventional first field of a 525 line video image frame comprised of all the even image lines scanned by camera source 12. During a second field timing period (which may also coincide with the one above-mentioned), read/write controller 32 successively selects row addresses 264, 265, 266, 267, . . . , 525 of frame memory 26, from which video information stored at each row address is read out and applied to D/A converter stage 42. As a result, the stored "second even field" is converted into a conventional second field of the 525 even line video image frame. The first and second fields output from D/A converter 42 are applied to TV modulator 44 which is preferably of the same construction as TV modulator 38, and derives its broadcast carrier frequency from the common RF oscillator source 40. As discussed later below, it may be desirable to provide a carrier phase shifter 41 between the source 40 and modulator 44 so as to cause the modulators 38, 44 to develop two carrier waves having a 90 degree RF phase shift relative to one another. TV modulator 44 combines the H and the V synchronization pulses produced by sync generator 39, in correctly timed relation with the analog signals output from D/A converter 42.

The output of TV modulator 38 drives RF amplifier 46, and the output of TV modulator 44 is supplied to drive RF amplifier 48. RF amplifiers 46 and 48 may be conventional units, preferably of identical construction.

RF amplifier 46 is connected through transmission line 50 to excite antenna 52, and RF amplifier 48 has its output fed through transmission line 54 to drive antenna 56. Antennas 52 and 56 may have similar configurations and gain, but must have mutually orthogonal polarizations. For example, if antenna 52 is linearly horizontally polarized, antenna 56 must be linearly vertically polarized, or vice versa. Alternatively, antenna 52 can be circularly or elliptically polarized in a first sense of rotation, while antenna 56 is circularly or elliptically polarized in a second sense of rotation opposite to the first sense.

Antennas 52 and 56 can be located together at a common transmitting site, in which case it is preferred that known techniques for minimizing inter-element coupling between the two antennas 52, 56 be implemented.

Figure 2:
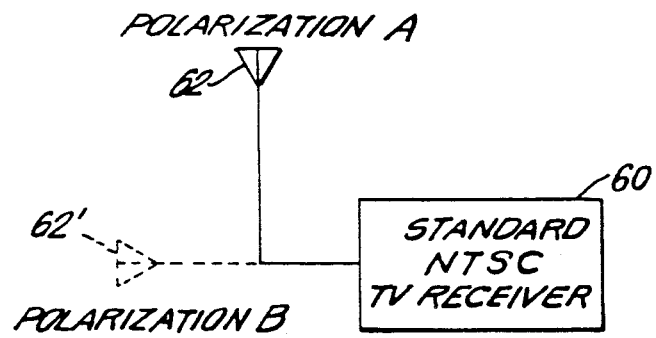
FIG. 2 is a representation of a standard TV receiver arranged to receive HDTV signals broadcast by the system of FIG. 1.

A television signal broadcast from the antennas 52, 56 can, as shown in FIG. 2, be received and viewed with a standard NTSC receiver 60. A receiving antenna 62 for the receiver 60 should have a polarization corresponding directly to one of the transmitting antennas 52, 56, e.g., polarization A corresponding to transmitting antenna 52. Alternatively, an orthogonally polarized receiving antenna 62' having polarization B corresponding to transmitting antenna 56, can be used for optimum reception by the receiver 60.

Accordingly, when using receiving antenna 62, the conventional NTSC receiver 60 will reproduce the interlaced 525 "odd line" video image frames that are output from the modulator 38, amplified by RF amplifier 46 and radiated from antenna 52. With receiving antenna 62', receiver 60 will reproduce the interlaced, 525 line "even line" video image frames that are output from the modulator 44, amplified by RF amplifier 48 and radiated from antenna 56.

Figure 3:
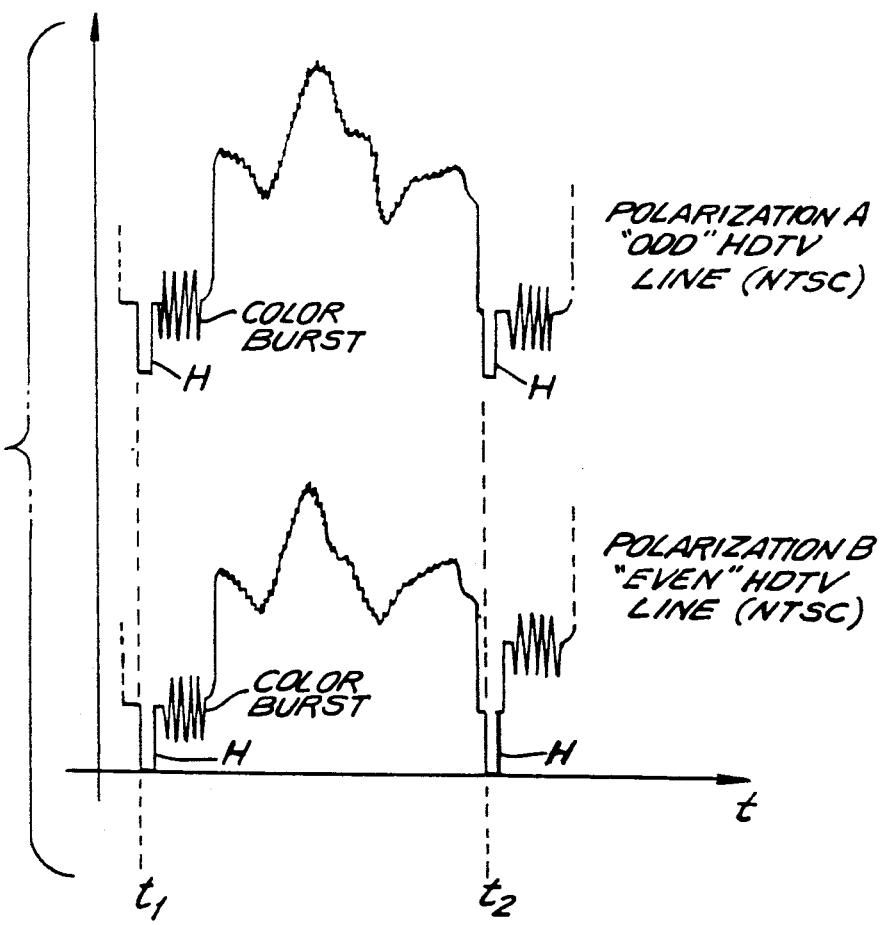
FIG. 3 is a timing diagram showing a phase relation between video signals broadcast simultaneously by the system of FIG. 1.

If the transmitting antennas 52, 56 are relatively closely situated to one another, adjacent lines of the NTSC video signals as modulated on the respective transmitted RF carrier waves, can be propagated substantially in phase as represented in FIG. 3. Accordingly, tips of corresponding horizontal synchronization pulses will be detected at substantially the same times ($t_1$, $t_2$, etc.) whether the receiver 60 responds to the carrier waves transmitted from antenna 52 or those broadcast from antenna 56. This feature of the system 10 recognizes the fact that under less than theoretically ideal conditions, receiving antenna 62 (or 62') associated with the conventional receiver 60 will also respond to some degree to orthogonally polarized waves propagating from the transmitting antenna 56 (or 52). By providing for the horizontal synchronization pulse tips of both broadcast waves to be propagated substantially in phase through space, synchronization pulses modulated on one of the orthogonally polarized waves will not be separately detected by receiver 60 possibly to interfere with detection of the video image lines modulated on the other broadcast wave whose polarization is matched by the receiving antenna 62.

Figure 4:
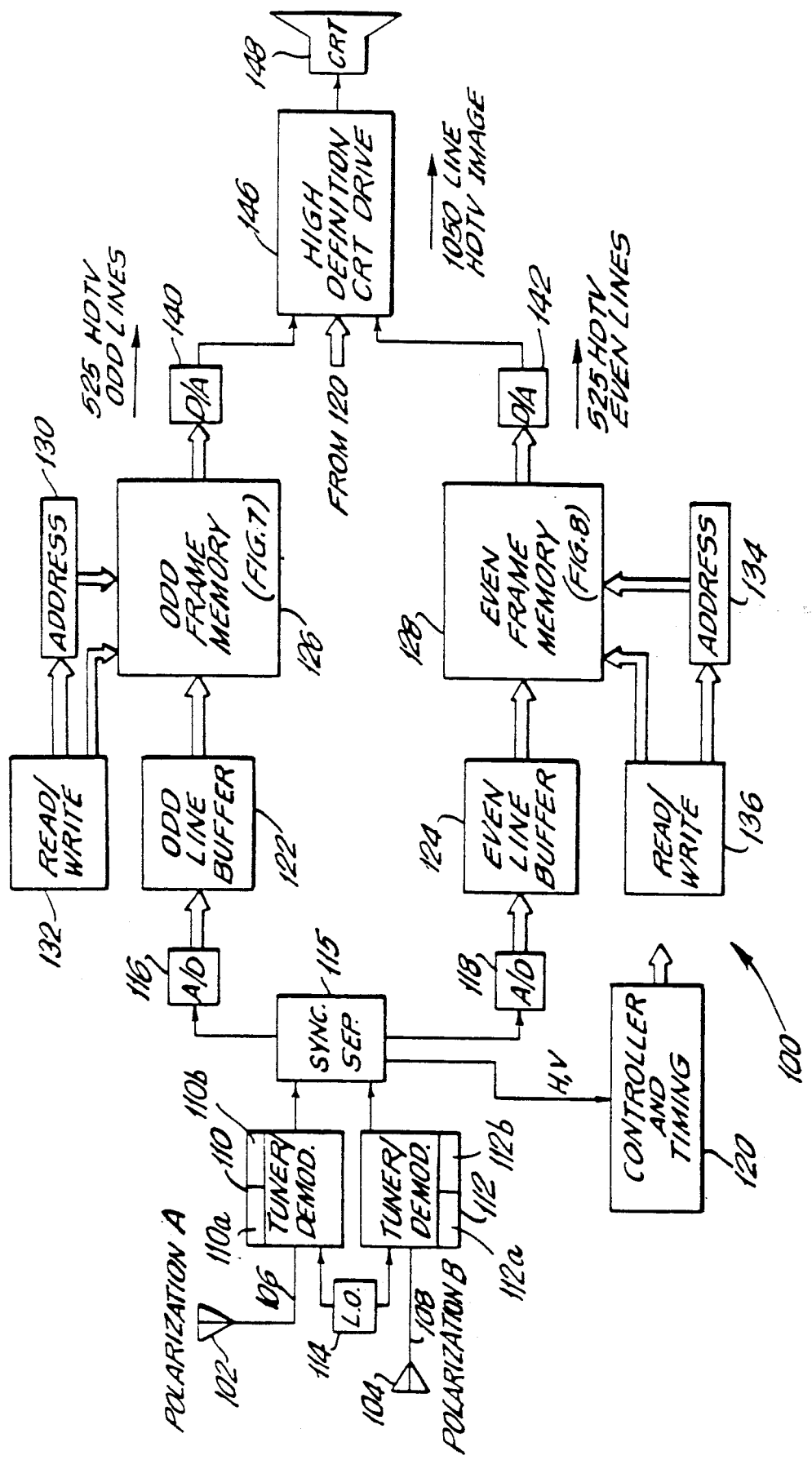
FIG. 4 is a schematic block diagram of a HDTV receiving system according to the invention.

FIG. 4 is a schematic block diagram of a HDTV receiving system 100 according to the invention.

A dual polarization receiving antenna array includes antennas 102 and 104. Antenna 102 is polarized to match the polarization A of transmitting antenna 52, while antenna 104 is of the orthogonal polarization B to match that of transmitting antenna 56. Antennas 102, 104 can be located relatively close to one another at a common receiving site. In such case, known decoupling techniques should be employed to minimize interelement coupling between the two antennas 102, 104.

Lead-in transmission lines or cables 106, 108 are connected between the antennas 102, 104 and respective tuner/demodulator systems 110, 112. The cables 106, 108 should be shielded or otherwise electrically isolated from one another. Systems 110, 112 may each include radio frequency (RF) amplifier, mixer, intermediate frequency (IF) and video detector stages. A common local oscillator stage 114 should be provided to ensure common frequency tracking by both of the tuner/demodulator systems 110, 112. Also, as discussed later below, it may be desirable to provide synchronous detector stages 110a, 112a in the systems 110, 112, wherein the stages 110a, 112a synchronize their detection operation according to the phase of the received RF carrier wave signals.

Signals output from system 110 comprise the odd lines of each 1,050 line image scanned by camera source 12 of the transmitting system 10, as broadcast on a first carrier wave of polarization A. The signals output from system 112 comprise the even lines of each 1,050 line image scanned by the camera source 12, as broadcast on a second carrier wave of polarization B but having the same frequency as the first carrier wave. The signals output from the tuner/demodulator systems 110, 112 may be in the form of separate luminance and chrominance signals corresponding to the image lines detected from each of the broadcast carrier waves.

After separation of the horizontal and vertical synchronization pulses from the detected video signals by sync separator 115, output signals from tuner/demodulator system 110 are input to A/D converter stage 116, and the signals produced by system 112 are input to A/D converter stage 118. A/D converter stages 116, 118 and other processing components of the receiving system 100 are subject to control by controller and timing circuitry 120 which, in turn, includes means for generating operational timing and clock signals that track the phase of the separated synchronization pulses.

Successive ones of the demodulated odd line video signals are output from A/D converter 116 and entered for temporary storage in odd line buffer or latch 122. Similarly, the demodulated even line video signals are successively output from A/D converter 118 and held in even line buffer 124. Buffers 122, 124 can be known line memory devices.

Each odd line of video information latched in the buffer 122 is written into a selected row address of odd frame memory stage 126. Similarly, each even line of video information latched in the buffer 124 is written into a selected row address of even frame memory stage 128. The odd and the even frame memory stages 126, 128 each may include one or more frame memory or storage devices capable of storing luminance and chrominance information for a 525 line video image, wherein a predetermined number of picture elements or pixels define each line.

Writing of each odd line of information from the odd line buffer 122 into selected row addresses of the odd frame memory 126, is performed under the control of address select circuit 130 and read/write controller 132 which, in turn, are subject to the control of controller and timing circuitry 120. Writing of each even line of information from the even line buffer 124 into selected row addresses of the even frame memory 128, is accomplished through write address select circuit 134 and read/write controller 136 which, in turn, are also subject to control by the controller and timing circuitry 120.

Figure 7:
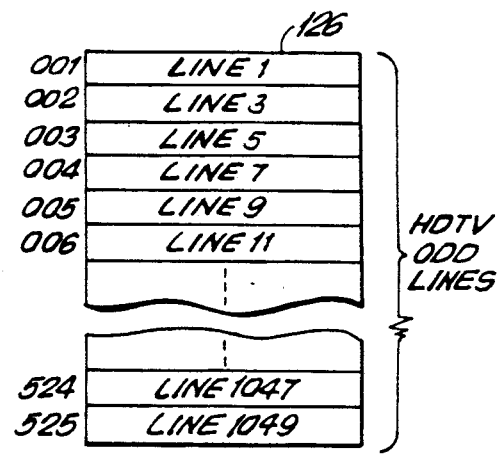
FIG. 7 is a memory map showing addresses for storage of odd image lines in a frame memory of the system in FIG. 4.
Figure 8:
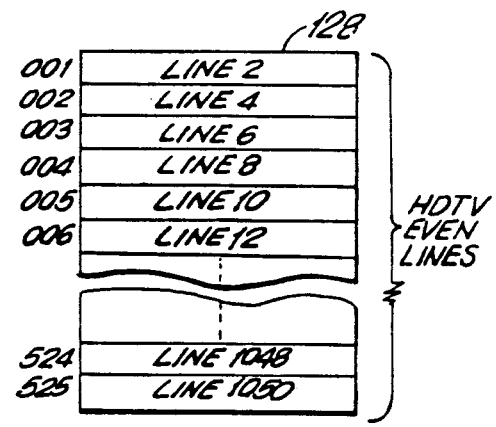
FIG. 8 is a memory map showing addresses for storage of even image lines in a frame memory of the system in FIG. 4.

FIGS. 7 and 8 are memory maps representing address storage locations in the frame memories 126, 128, respectively.

Recall that the output of the tuner/demodulator system 110 and, thus, the output of A/D converter 116, corresponds to an interlaced 525-line video frame comprised of all odd lines of the 1,050 lines scanned by camera source 12 in the transmitting system 10. The line number order of the video information signals output from A/D converter 116 is, therefore, line 1, line 5, line 9, line 13, ..., line 1049, which define the "first odd field". Next, signals representing lines 3, 7, 11, 15, ..., 1047, are produced from A/D converter 116. In order to obtain all the odd lines of the 1,050 lines scanned by camera source 12 in successive order, read/write controller 132 and address select circuit 130 operate to write each line of video information as output from odd line buffer 122 in row address locations of the odd frame memory 126, according to the memory map of FIG. 7.

Specifically, during a first odd field time period, video information corresponding to line 1 is written in row address 001, line 5 in address 003, line 9 in address 005, ..., line 1049 in address 525. That is, during the first odd field time period, the video line information is written in successive odd row addresses of frame memory 126, as output from buffer 122.

During a second odd field time period, video information corresponding to line 3 is written in row address 002, line 7 in address 004, line 11 in address 006, ..., line 1047 in address 524. Accordingly, during the second odd field time period, the video information is written in successive even row addresses of frame memory 126, as output from buffer 122.

The 525 line video information thus stored in odd frame memory 126 forms, as shown in FIG. 7, consecutive odd numbered lines of a 1050 line image frame to be reproduced by the receiving system 100.

Likewise, it will be recalled that the output of the tuner/demodulator system 112 and, thus, the output of A/D converter 118, corresponds to an interlaced 525-line video frame comprised of all even lines of the 1,050 lines scanned by camera source 12 in the transmitting system 10. The line number order of the video information signals output from A/D converter 118 is, therefore, line 2, line 6, line 10, line 14, ..., line 1050, which define the "first even field". Next, signals representing lines 4, 8, 12, 16, ..., 1048, are produced from A/D converter 118. In order to obtain all the even lines of the 1050 lines scanned by camera source 12 in successive order, read/write controller 136 and address select circuit 134 operate to write each line of video information as output from even line buffer 124 in row address locations of the even frame memory 128, according to the memory map of FIG. 8.

Specifically, during a first even field time period, video information corresponding to line 2 is written in row address 001, line 6 in address 003, line 10 in address 005, ..., line 1050 in address 525. That is, during the first even field time period, the video line information is written in successive odd row addresses of frame memory 128, as output from buffer 124.

During a second even field time period, video information corresponding to line 4 is written in row address 002, line 8 in address 004, line 12 in address 006, ..., line 1048 in address 524. Accordingly, during the second even field time period, the video information is written in successive even row addresses of frame memory 128, as output from buffer 124.

The 525 line video information thus stored in even frame memory 128 defines, as shown in FIG. 8, consecutive even numbered lines of the 1050 line image frame to be reproduced by the receiving system 100.

Reproduction of the 1050 line high definition image by system 100 is then carried out as follows.

Row addresses of the odd frame memory 126 are selected successively by address select circuit 130, in the order 001, 002, 003, ..., 525, and the stored line information is read out and input to D/A converter stage 140.

Row addresses of the even frame memory 128 are selected successively by address select circuit 134, in the order 001, 002, 003, ..., 525, and the stored line information is read out and input to D/A converter stage 142.

Outputs of the D/A converters 140, 142 are supplied to a high definition CRT drive system 146 for reproduction by a 1050 line CRT 148. It is presently contemplated that CRT 148 will be driven correspondingly to the high resolution vidicon in camera source 12 of the transmitting system 10. Namely, by use of a wobble signal generator or the like, adjacent pairs of lines, wherein each pair includes an odd and an even numbered line, are swept simultaneously across the CRT face. Such an arrangement is disclosed in, for example, the earlier mentioned U.S. Pat. No. 4,707,728.

Audio signals may be frequency modulated in a conventional manner on one or both of the orthogonally polarized television signals radiated by the transmitting antennas 52, 56. Standard audio FM detector means in one or both of the tuner/demodulator systems 110, 112 then provides the detected audio to an amplifier and speaker system (not shown) associated with the receiving system 100.

Stereo sound can be realized by modulating, for example, a Left plus Right audio signal on one of the polarized transmitted signals, and a Left minus Right audio signal on the orthogonally polarized transmitted signal. When the demodulated audio signals are supplied to stereo FM decoding circuitry provided at the receiving system 100, separate Left and Right audio signals are obtained for amplification and sounding.

While the present disclosure refers to NTSC broadcasting standards, it will be apparent that the disclosed system and technique can be applied to any other television broadcasting system such as, for example, PAL, SECAM, and the mentioned MAC system, as well. Also, various known digital signal processing techniques can be incorporated in the present system. Visual and aural information in digital form can be modulated on one or both of the transmitted RF carrier waves by the broadcasting system 10, and decoded by appropriate circuitry at the receiving system 100.

Further, the illustrated embodiment provides for progressive scanning of the high definition CRT 148 of the receiving system 100, in correspondence with the image scanning by the camera source 12. It will also be apparent that the camera source 12 can be made to scan each image frame in an interlaced manner, in which case the CRT 148 can also be driven to scan in correspondence with the camera source 12.

As mentioned, polarization discrimination in excess of 20 dB is reported when orthogonal circularly polarized transmitting and receiving antenna pairs are employed for frequency reuse with communications satellites. When radiating mutually orthogonally polarized waves over ground at VHF-UHF frequencies, a potential problem of depolarization of one or both waves might exist when certain objects or structures are within the path of propagation between the transmitting site and the receiving site. Such a problem can be met with good antenna engineering design at both the transmitting and the receiving sites, including the proper selection of the transmitting site, or the use of a multiple or cellular transmitting site plan for certain geographical areas to ensure satisfactory viewer coverage.

Further, by radiating the two carrier waves with a fixed 90 degree RF phase shift from the transmitting site(s), synchronous detection may be incorporated in the front ends of the tuner/demodulator systems 110, 112 of receiving system 100, so as to enhance discrimination of the image lines modulated on the two carrier waves. See, for example, H. W. Sams & Co.; Reference Data for Engineers: Radio, Electronics, Computer, and Communications, at 23-6 (7th ed. 1985). To enable phase synchronization of the front ends of high definition receivers with the two transmitted carrier waves, the RF amplifiers 46, 48 can be alternatingly keyed on/off over designated lines of the vertical blanking interval. For example, if during the time for transmission of dark lines 11 and 12 only amplifier 46 is keyed on, tuner/demodulator 110 can be phase synchronized with the RF carrier wave originating from amplifier 46 during a counted timing for the lines 11 and 12. Moreover, the horizontal sync pulses H may be transmitted via only one of the two carrier waves at a time, so as to enable carrier phase synchronization during transmission of an entire image frame.

In NTSC non-compatible applications, it may not be necessary to maintain more than several dB power level difference between the received carrier waves such as, for example, if the transmitted information is frequency modulated, or amplitude modulated in digital form. In either case, conventional threshold detection circuitry 110b, 112b in the tuner/demodulator systems 110, 112 of the receiving system 100 can capture the information modulated on the received higher level carrier wave.

With respect to cable television applications, the high definition 1,050 line image frame can be transmitted either by (1) a two-cable arrangement with the two compatible 525 line image signals transmitted over corresponding "A" and "B" cables on the same cable channel, or (2) a single cable with the two compatible 525 line image signals transmitted over two adjacent channels.

While the foregoing description represents a preferred embodiment of the invention, it will be obvious to those skilled in the art that various changes and modifications may be made, without departing from the true spirit and scope of the invention as pointed out in the following claims.

What is claimed is:

1. Television transmitting apparatus, comprising:
   image source means for generating image line signals corresponding to an image frame having a resolution of N scan lines, wherein successive lines n comprising the image frame are consecutively numbered from n=1 to N;
   first modulator means coupled to the image source means for modulating image line signals corresponding to odd numbered lines of the image frame on a first radio frequency (RF) carrier wave signal of a certain phase to produce corresponding odd line image signals;
   second modulator means coupled to the image source means for modulating image line signals corresponding to even numbered lines of the image frame on a second RF carrier wave signal of a certain phase to produce corresponding even line image signals; and
   control means coupled to the image source means for causing the image source means to supply the image line signals to the first and the second modulator means so that corresponding portions of the image line signals are modulated on said carrier wave signals simultaneously with one another by both of said first and said second modulator means.

2. The television transmitting apparatus of claim 1, including
   first antenna means coupled to an output of said first modulator means for radiating the odd line image signals, said first antenna means having a first polarization, and
   second antenna means coupled to an output of said second modulator means for radiating the even line image signals, said second antenna means having a second polarization orthogonal to said first polarization.

3. The television transmitting apparatus of claim 2, wherein said first and said second polarizations are circular polarizations having opposite senses of rotation.

4. The television transmitting apparatus of claim 1, including RF oscillator source means coupled to said first and said second modulator means, for providing a common frequency signal source for each of said first and said second RF carrier wave signals.

5. The television transmitting apparatus of claim 1, including means for shifting the phase of the RF carrier wave signals associated with the first and the second modulator means by 90 degrees relative to one another.

6. Television receiving apparatus for reproducing a transmitted image frame, comprising:
   first tuner/demodulator means for detecting first image line signals modulated on a first received carrier signal having a certain carrier frequency;
   second tuner/demodulator means for detecting second image line signals modulated on a second received carrier signal having a certain carrier frequency;
   display drive means coupled to the first and the second tuner/demodulator means;
   control means coupled to the display drive means for supplying the detected first and second image line signals from both of the tuner/demodulator means to the display drive means with a determined timing, so that said display drive means can drive an associated display to reproduce the transmitted image frame; and
   local oscillator means coupled to said first and said second tuner/demodulator means, for providing a single frequency signal source to enable common frequency tracking by both of said tuner/demodulator means.

7. The television receiving apparatus of claim 6, wherein at least one of said first and said second tuner/demodulator means includes means responsive to a received RF carrier signal of a given phase, for synchronizing its detection operation in accordance with the given phase of the received RF carrier signal.

8. A method of transmitting television signals, comprising:
   generating from image source means image signals corresponding to certain parts of an image frame to be transmitted;
   first modulating first image signals from the image source means corresponding to first contents of the image frame on a first radio frequency (RF) carrier wave signal of a certain phase to produce corresponding first RF television signals;

second modulating second image signals from the image source means corresponding to second contents of the image frame on a second RF carrier wave signal of a certain phase to produce corresponding second RF television signals; and carrying out said first and said second modulating steps so that corresponding portions of the first and the second image signals are modulated on said carrier wave signals for transmission simultaneously with one another.

9. The television signal transmitting method of claim 8, including frequency modulating the image signals generated by the image source means on said RF carrier wave signals.

10. The television signal transmitting method of claim 8, including modulating the image signals generated by the image source means on said RF carrier wave signals in digital form.

11. The television signal transmitting method of claim 8, including
radiating the first RF television signals from first antenna means having a first polarization, and
radiating the second RF television signals from second antenna means having a second polarization orthogonal to said first polarization.

12. The television signal transmitting method of claim 11, including arranging the first and the second antenna means so that said first and said second polarizations are circular polarizations having opposite senses of rotation.

13. The television signal transmitting method of claim 8, including providing a common frequency signal source for each of said first and said second RF carrier wave signals.

14. The television signal transmitting method of claim 8, including shifting the phase of the first RF carrier wave signal as transmitted by 90 degrees relative to the phase of the second RF carrier wave signal as transmitted.

15. A technique of broadcasting and receiving television signals, comprising:
generating from image source means image signals corresponding to certain parts of an image frame to be transmitted;
modulating first image signals from the image source means corresponding to first contents of the image frame on a first radio frequency (RF) carrier wave signal of a certain phase to produce corresponding first RF television signals;
modulating second image signals from the image source means corresponding to second contents of the image frame on a second RF carrier wave signal of a certain phase to produce corresponding second RF television signals;
radiating the first RF television signals from first antenna means having a first polarization;
radiating the second RF television signals from second antenna means having a second polarization orthogonal to said first polarization,
detecting with first tuner/demodulator means at a receiver the first RF television signals modulated on the first RF carrier wave signal thereby obtaining said first image signals;
detecting with second tuner/demodulator means at the receiver the second RF television signals modulated on the second RF carrier wave signal thereby obtaining said second image signals;
providing a signal frequency signal source at said receiver to enable common frequency tracking by both of said tuner/demodulator means; and
supplying the obtained first and second image signals to display drive means at a certain timing determined so that the display drive means drives an associated display to reproduce the transmitted image frame.

16. The television broadcasting technique of claim 15, including synchronizing a detection operation of at least one of the tuner/demodulator means in said receiver in accordance with the phase of the RF carrier signal being detected by said tuner/demodulator means.

17. The television broadcasting technique of claim 15, including frequency modulating the image signals generated by the image source means on said RF carrier wave signals.

18. The television broadcasting technique of claim 15, including modulating the image signals generated by the image source means on said RF carrier wave signals in digital form.

19. A spectrum-efficient channel compatible technique of broadcasting and receiving television signals, comprising:
generating from image source means image signals corresponding to certain parts of an image frame to be transmitted;
modulating first image signals from the image source means corresponding to first contents of the image frame on a first radio frequency (RF) carrier wave signal corresponding to a certain television channel to produce corresponding first RF television signals;
modulating second image signals from the image source means corresponding to second contents of the image frame on a second RF carrier wave signal corresponding to said certain television channel to produce corresponding second RF television signals;
radiating the first RF television signals from first antenna means having a first polarization;
radiating the second RF television signals from second antenna means having a second polarization orthogonal to said first polarization;
detecting with first tuner/demodulator means at a receiver the first RF television signals modulated on the first RF carrier wave signal thereby obtaining said first image signals;
detecting with second tuner/demodulator means at the receiver the second RF television signals modulated on the second RF carrier wave signal thereby obtaining said second image signals;
providing the tuner/demodulator means with threshold detection means thereby enabling each of the tuner/demodulator means to capture the RF television signals modulated on a received higher level RF carrier wave signal coupled to the tuner/demodulator means; and
supplying the obtained first and second image signals to display drive means at a certain timing determined so that the display drive means drives an associated display to reproduce the transmitted image frame.

20. The television broadcasting technique of claim 19, including frequency modulating the image signals generated by the image source means on said RF carrier wave signals.

21. The television broadcasting technique of claim 19, including modulating the image signals generated by the image source means on said RF carrier wave signals in digital form.

22. Television receiving apparatus for reproducing an image frame contents of which are modulated on carrier waves corresponding to a certain television channel, comprising:

first tuner/demodulator means for detecting first image signals corresponding to first contents of an image frame when the first tuner/demodulator means is tuned to receive a carrier wave in a selected television channel;

second tuner/demodulator means for detecting second image signals corresponding to second contents of the image frame when the second tuner/demodulator means is tuned to receive a carrier wave in the selected television channel;

display drive means coupled to the first and the second tuner/demodulator means;

control means coupled to the display drive means for supplying the detected first and second image signals from both of the tuner/demodulator means to the display drive means with a determined timing, so that said display drive means can drive an associated display to reproduce the transmitted image frame; and threshold detection means associated with said first and said second tuner/demodulator means, for enabling each of the tuner/demodulator means to capture the image signal modulated on a received higher level carrier wave when both of the tuner demodulator means are tuned to the selected television channel.

23. The television receiving apparatus of claim 22, wherein said threshold detection means includes means for capturing image signals that are frequency modulated on a received higher level carrier wave.

24. The television receiving apparatus of claim 22, wherein said threshold detection means includes means for capturing image signals that are modulated on a received carrier wave in digital form.

* * * * *